Patented May 11, 1937

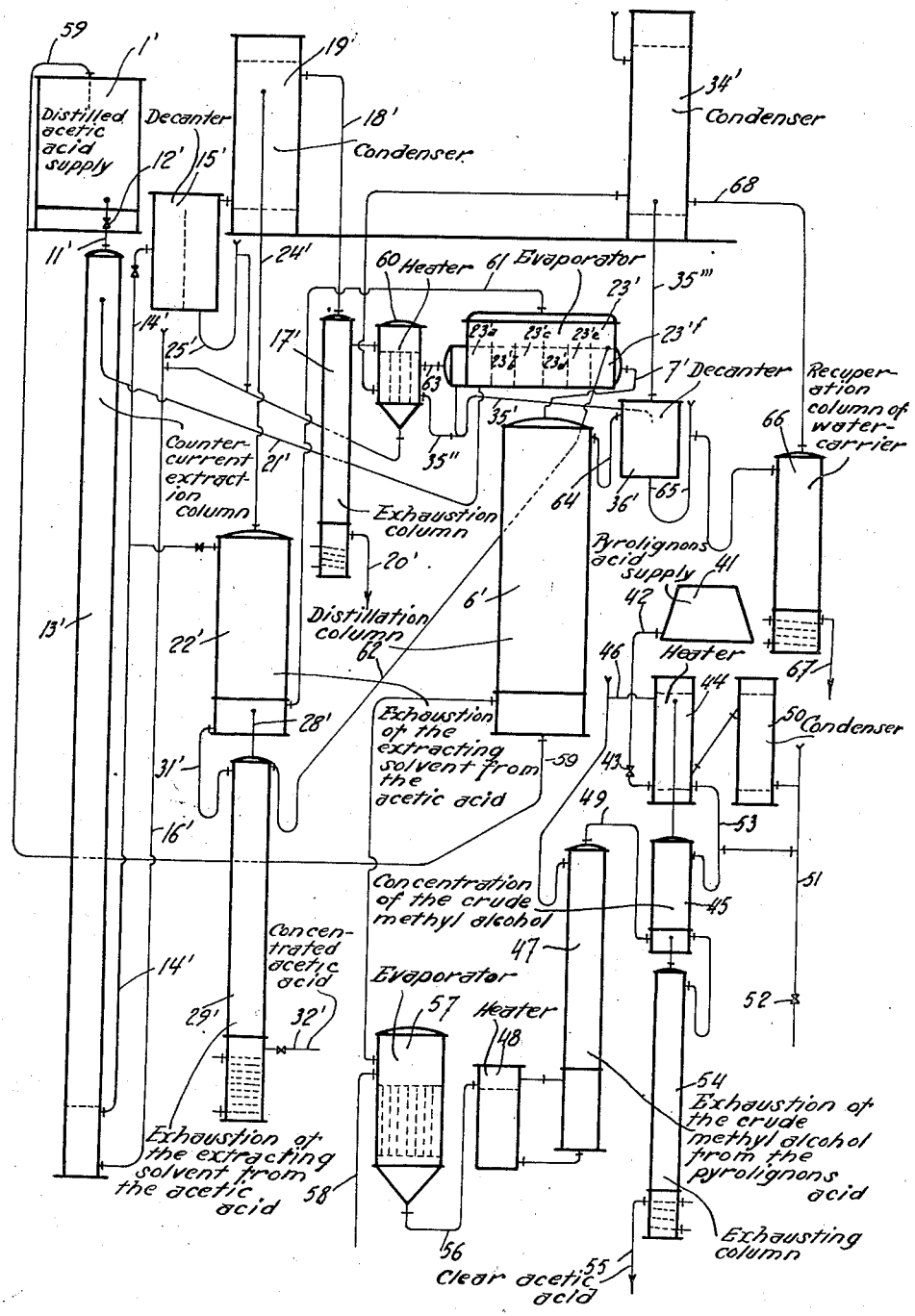

2,079,789

UNITED STATES PATENT OFFICE 2,079,789

TREATMENT OF AQUEOUS SOLUTIONS OF ACETIC ACID

Ernest André Charles, Clamecy, France, assignor to Société des Produits Chimiques de Clamecy, Clamecy, France, and Etablissements Lambiotte Frères, Premery, France, corporations of France Application July 22, 1935, Serial No. 32,572
In France July 10, 1935

6 Claims. (Cl. 260—122)

This invention relates to a process for concentrating aqueous solutions of acetic acid.

Several methods have been already proposed for concentrating acetic acid in aqueous solutions. One of these methods, which has already been described in year 1884 by Goering consists in extracting the acetic acid in a liquid phase by means of solvents having a low boiling temperature such as ethyl acetate, ethyl oxide, amyl-alcohol and the like, the said solvents being then separated from the acid by any usual distillation process. The said extracting method which a priori seems to be simple and economical, is however from the calorific point of view not so economical as it seems to be, since experience shows that it leads, in order not to necessitate a too costly extraction material, to the use of quantities of solvent which are equal to several times the volume of the solution to be exhausted, and the subsequent evaporation and dephlegmation of which require a considerable consumption of heat.

Other methods consist in treating the water and acid mixture in the vapor phase in a column by means of a suitable third body acting as a solvent for the acid. Among such methods it will be well to mention more particularly the method of azeotropic concentration, in which the third body plays the part of a water carrier and which requires the total vaporization of the diluted solution and of the carrier.

Now it has been found that it was possible, according to the present invention, to realize a considerable economy of steam by combining in a judicious manner the method of extraction of acetic acid in the liquid phase by means of a solvent with a method of treatment in the vapor phase.

For this purpose the invention essentially consists in distilling the acid solution to be concentrated in the presence of a water-entraining liquid or carrier to partially dehydrate the solution, subjecting the partially dehydrated solution to an extraction treatment in a liquid state by treating the solution with a solvent for acetic acid, and evaporating the extraction solvent at least partially by the heat evolved in the condensation of the product of the distillation, the extracting solvent having a boiling point low enough so that it can be vaporized by said heat and also being one which forms an azeotropic mixture with water.

When operating at atmospheric pressure the solvents used for extracting the acetic acid in a liquid phase are preferably bodies having a low boiling point such as methyl-propionate, ethyl acetate, isopropyl oxide, propyl oxide or mixtures of such bodies. When the vaporization of the extracting solvent is effected at a pressure which is lower than the pressure for the treatment in the vapor phase, solvents having higher boiling points may be used.

The extraction of the acid by the solvent may be effected in a counter-current device of any type, either static or dynamic.

In the portion of the process in which the acid is partially dehydrated azeotropically, the bodies which may be used as water carriers are more particularly butyl acetate, mesityl oxide, light wood oils, butyl alcohol, amyl alcohols, ethyl butyrate or mixture of such bodies, or other bodies capable of forming with water an eutectic the condensation temperature of which at the pressure at which the treatment is effected is high enough for producing the vaporization of the solvent used for the extraction of the acid in the liquid phase.

In carrying out the process the relative amounts of dehydration by the azeotropic distillation and by the liquid extraction are preferably so proportioned that the heat which can be recovered in the first treatment corresponds substantially to the heat required for the process of the second treatment.

A device for carrying out the process according to the present invention is shown diagrammatically and by way of a non-restrictive example in the appended drawing.

In the example shown in the drawing, 41 is a vessel containing a supply of crude pyroligneous acid which is conducted through a pipe 42 with a controlling cock 43 into a heater 44 heated by the vapors of crude alcohol escaping at the top of a column 45 the action of which will be explained hereafter. After heating, the pyroligneous acid is conducted through a pipe 46 to the top of a column 47 adapted for exhausting the crude methyl alcohol therefrom and heated at the bottom by a heater 48. In order to expel all the crude alcohol it is necessary to vaporize from 20 to 30% of pyroligneous acid in the column 47. The vapors which escape at the top of this column 47 are conducted through a pipe 49 to the bottom of the column 45 in which they are concentrated. The vapors escaping from this latter column are partly condensed in the heater 44 and the remaining part is condensed in a condenser 50. The crude alcohol is removed from the condenser 50 through a pipe 51 provided with a cock 52, while the parts to be refluxed return to the top of the column 45 through a pipe 53. The liquid which is collected at the bottom of the column 45 refluxes into a column 54 in which the alcohol is exhausted therefrom, and then a clear solution of 6–8% of acid flows out at 55 which represents 75–85% of the weight of the vapor coming from the column 47.

The pyroligneous acid freed from alcohol flows from the heater 48 through a pipe 56 which conducts it into an evaporation heater 57.

The tar flowing from this latter heater through the pipe 58 can be led into another heater or into an exhausting column, while the dilute acid vapors are led to the bottom of a dehydration column 6' the upper part of which is filled with a water carrier or entraining liquid, such as certain fractions of wood oil which boil at a temperature between 110 and 120° C. and give with water an eutectic boiling at 92° C. The eutectic mixture of vapors escapes approximately free from acid at the top of the column 6' through a pipe 7' and the parts refluxing from the said column, constituting partially dehydrated acid, flow out at the bottom of this column. The clear liquid thus obtained is then added to the liquid which flows out of the pipe 55 and the mixture which contains all the acid distilled from the pyroligneous acid is led through a pipe 59 to a supply vessel 1'.

From the vessel 1' the said clear liquid is directed through a line 11' provided with a cock 12' into an extraction device 13' of the countercurrent type comprising here a column containing contact elements, the liquid to be treated arriving at the top of the said column and the solvent (for instance methyl propionate) arriving at the bottom thereof through a pipe 14'. The water flows out approximately free from acid through a line 16' and is led to a pre-heater 60 (heated in a manner to be described later) from which it is discharged into a small column 17' in which it is freed from the dissolved solvent; the latter is returned through a line 18' to a condenser 19' while the water is discharged at 20'. On another hand, the solvent, which is saturated with acetic acid, is discharged in a continuous manner from the exhaustion column 13' through a pipe 21' and is conducted into a vaporization device 23' comprising a series of horizontal tubes divided into compartments 23'ᵃ, 23'ᵇ ... 23'ᶠ, through which the vapors of the eutectic coming from the distillation column 6' through the pipe 7' pass.

The vapors of the solvent and water in azeotropic mixture, and some of the acetic acid produced in the vaporizer 23' are conducted through a pipe 61 to the bottom of a column 22' at the top of which a mixture of vapors of solvent and water escapes in an azeotropic mixture, which is conducted through a pipe 24' into the condenser 19'. The heterogeneous condensate produced in this latter flows into a decanter 15' where it is decanted and from which the solvent is returned through the pipe 14' to the exhaustion column 13'. The water flowing out of the decanter 15' at 25' is led into the pipe 16' where it is added to the exhausted waters flowing out of the counter-current column 13' and going to the heater 60.

At the bottom of the column 22' a ternary mixture of solvent, acetic acid and water flows out and is directed through a pipe 31' into a column 29' which also receives through a pipe 62 the non-vaporized liquid which flows out through the overflow of the last compartment 23'ᶠ of the vaporizer 23'. The said column 29' exhausts from the acid the solvent and water and the vapors of these bodies are returned through a pipe 28' to the bottom of the column 22', while the concentrated acetic acid is drawn off at 32'. Columns 22' and 29' function in effect as a single column.

The vapor of the eutectic formed by the water and the wood oils coming from the dehydration column 6' and flowing through the vaporizer 23' is partially condensed in this latter. The non-condensed vapor is led by means of a pipe 63 through the heater 60 for the waters which are saturated with solvent and is led then into a condenser 34'. The liquid which is condensed in the devices 23', 60 and 34' is led through pipes 35', 35'' and 35''' into a decanter 36' where it is decanted. The water-carrier or entraining liquid is returned in a continuous manner through a pipe 64 to the top of the dehydration column 6' and the waters which are saturated with the carrier are conducted through a pipe 65 into an exhaustion column 66. The exhausted water is led to the sewage through a pipe 67; the carrier and water vapors which escape at the top of the column 66 are conducted to the condenser 34' through a pipe 68.

In order to insure the extraction of certain impurities of the acetic acid which are contained in the clear liquid received by the vessel 1' at the outlet of the dehydration column 6' and more particularly the acids of the upper group having a partition coefficient which is higher than the partition coefficient of the acetic acid, a first extraction can be effected by means of a small quantity of solvent in a counter-current column located before the column 13'. The saturated solvent is then distilled by means of the vapors coming from the column 6' in the same conditions as the saturated solvent which flows out of the column 13'.

What I claim is:

1. A process for concentrating a dilute aqueous solution of acetic acid which comprises distilling said acid in the presence of an entraining liquid to partially dehydrate the same azeotropically, subjecting the partially dehydrated acid to an extraction treatment in a liquid state with a solvent for acetic acid, and evaporating the extraction solvent at least partially by the heat evolved in the condensation of the vapor of the azeotropic distillation, the extracting solvent having a boiling point low enough so that it can be vaporized by said heat and also being one which forms an azeotropic mixture with water.

2. A process for producing concentrated acetic acid from pyroligneous acid which comprises distilling the pyroligneous acid to remove the alcohol therefrom and to separate a portion of the acetic acid, distilling the residue of said de-alcoholized acid in the presence of an entraining liquid to partially dehydrate the acid azeotropically, subjecting the first distilled acid and the partially dehydrated acid to an extraction treatment in a liquid state with a solvent for acetic acid, and evaporating the extraction solvent at least partially by the heat evolved in the condensation of the vapor of the azeotropic distillation, the extracting solvent having a boiling point low enough so that it can be vaporized by said heat and also being one which forms an azeotropic mixture with water.

3. A process for concentrating a dilute aqueous solution of acetic acid which comprises distilling said acid in the presence of an entraining liquid to partially dehydrate the same azeotropically, subjecting the partially dehydrated acid to an extraction treatment in a liquid state with a solvent for acetic acid, evaporating the extraction solvent at least partially from said acid by the heat evolved in the condensation of the vapor of the azeotropic distillation, the extracting solvent having a boiling point low enough so that it can be vaporized by said heat and also being one which forms an azeotropic mixture with water, and azeotropically separating from said acid any remaining water and solvent.

4. A process for producing concentrated acetic acid from pyroligneous acid which comprises distilling the pyroligneous acid to remove the alcohol therefrom and to separate a portion of the acetic acid, distilling the residue of said de-alcoholized acid in the presence of an entraining liquid to partially dehydrate the acid azeotropically, subjecting the first distilled acid and the partially dehydrated acid to an extraction treatment in a liquid state with a solvent for acetic acid, evaporating the extraction solvent at least partially from said acid by the heat evolved in the condensation of the vapor of the azeotropic distillation, the extracting solvent having a boiling point low enough so that it can be vaporized by said heat and also being one which forms an azeotropic mixture with water, and azeotropically separating from said acid any remaining water and solvent.

5. A process for concentrating a dilute aqueous solution of acetic acid which comprises distilling said acid in the presence of an entraining liquid to partially dehydrate the same azeotropically, subjecting the partially dehydrated acid to an extraction treatment in a liquid state with a solvent for acetic acid, evaporating the extraction solvent at least partially from said acid by the heat evolved in the condensation of the vapor of the azeotropic distillation, the extracting solvent having a boiling point low enough so that it can be vaporized by said heat and also being one which forms an azeotropic mixture with water, azeotropically separating from said acid any remaining water and solvent, decanting said water and solvent and employing said decanted solvent in the extraction treatment.

6. A process for producing concentrated acetic acid from pyroligneous acid which comprises distilling the pyroligneous acid to remove the alcohol therefrom and to separate a portion of the acetic acid, distilling the residue of said de-alcoholized acid in the presence of an entraining liquid to partially dehydrate the acid azeotropically, subjecting the first distilled acid and the partially dehydrated acid to an extraction treatment in a liquid state with a solvent for acetic acid, evaporating the extraction solvent at least partially from said acid by the heat evolved in the condensation of the vapor of the azeotropic distillation, the extracting solvent having a boiling point low enough so that it can be vaporized by said heat and also being one which forms an azeotropic mixture with water, azeotropically separating from said acid any remaining water and solvent, decanting said water and solvent and employing said decanted solvent in the extraction treatment.

ERNEST ANDRÉ CHARLES.